(12) United States Patent
Doi et al.

(10) Patent No.: US 12,068,471 B2
(45) Date of Patent: Aug. 20, 2024

(54) PREDOPING METHOD FOR NEGATIVE ELECTRODE ACTIVE MATERIAL, MANUFACTURING METHOD FOR NEGATIVE ELECTRODE, AND MANUFACTURING METHOD FOR POWER STORAGE DEVICE

(71) Applicant: NISSAN MOTOR CO., LTD., Yokohama (JP)

(72) Inventors: Shotaro Doi, Yokohama (JP); Yuki Kusachi, Yokohama (JP); Noboru Yamauchi, Yokohama (JP); Tomohiro Kaburagi, Yokohama (JP); Hideaki Horie, Yokohama (JP); Yusuke Nakashima, Kyoto (JP); Kazuya Tsuchida, Kyoto (JP); Naofumi Shoji, Kyoto (JP); Koji Sumiya, Minato-ku (JP); Shigehito Asano, Minato-ku (JP); Yasuyuki Koga, Minato-ku (JP); Nobuo Ando, Minato-ku (JP); Terukazu Kokubo, Minato-ku (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 888 days.

(21) Appl. No.: 16/971,865

(22) PCT Filed: Feb. 21, 2019

(86) PCT No.: PCT/JP2019/006574
§ 371 (c)(1),
(2) Date: Aug. 21, 2020

(87) PCT Pub. No.: WO2019/163894
PCT Pub. Date: Aug. 29, 2019

(65) Prior Publication Data
US 2021/0111389 A1 Apr. 15, 2021

(30) Foreign Application Priority Data
Feb. 22, 2018 (JP) .................................. 2018-029684

(51) Int. Cl.
*H01M 4/04* (2006.01)
*H01G 11/06* (2013.01)
(Continued)

(52) U.S. Cl.
CPC ............ *H01M 4/049* (2013.01); *H01G 11/06* (2013.01); *H01G 11/50* (2013.01); *H01G 11/86* (2013.01);
(Continued)

(58) Field of Classification Search
CPC .. H01M 4/049; H01M 4/139; H01M 10/0525; H01M 10/0566;
(Continued)

(56) References Cited

U.S. PATENT DOCUMENTS 10,122,044 B2 * 11/2018 Tan ...................... H01M 10/058
10,211,455 B2 * 2/2019 Pan ......................... H01M 4/38
(Continued)

FOREIGN PATENT DOCUMENTS

CN 101847744 A 9/2010
CN 105990608 A 10/2016
(Continued)

OTHER PUBLICATIONS

Chinese Office Action issued on Dec. 29, 2022 in Chinese Patent Application No. 201980014665.9 (with English translation), 18 pages.
(Continued)

*Primary Examiner* — Jeffrey T Carley
(74) *Attorney, Agent, or Firm* — Oblon, McClelland, Maier & Neustadt, L.L.P.

(57) ABSTRACT

A predoping method for a negative electrode active material to dope the negative electrode active material with lithium
(Continued)

ions using an electrolyte solution that includes lithium ions. The electrolyte solution includes at least one type of additive having a reduction potential higher than a reduction potential of a solvent contained in the electrolyte solution.

5 Claims, 2 Drawing Sheets

(51) Int. Cl.
    *H01G 11/50*     (2013.01)
    *H01G 11/86*     (2013.01)
    *H01M 4/139*     (2010.01)
    *H01M 10/0525*     (2010.01)
    *H01M 10/0566*     (2010.01)
    *H01M 4/02*     (2006.01)

(52) U.S. Cl.
    CPC ....... *H01M 4/139* (2013.01); *H01M 10/0525* (2013.01); *H01M 10/0566* (2013.01); *H01M 2004/027* (2013.01); *H01M 2300/0014* (2013.01); *H01M 2300/0025* (2013.01)

(58) Field of Classification Search
    CPC ... H01M 2004/027; H01M 2300/0014; H01M 2300/0025; H01G 11/06; H01G 11/50; H01G 11/86
    See application file for complete search history.

(56) References Cited

U.S. PATENT DOCUMENTS

| | | | | |
|---|---|---|---|---|
| 10,340,550 | B2* | 7/2019 | Azami | H01M 4/362 |
| 10,734,683 | B2* | 8/2020 | Jilek | H01M 10/44 |
| 2010/0255356 | A1* | 10/2010 | Fujii | H01G 11/06 |
| | | | | 429/94 |
| 2012/0042490 | A1* | 2/2012 | Lee | H01G 11/86 |
| | | | | 29/25.03 |
| 2015/0000118 | A1* | 1/2015 | Zhao | H01M 10/058 |
| | | | | 29/623.5 |
| 2015/0280227 | A1* | 10/2015 | He | H01G 11/14 |
| | | | | 429/246 |
| 2016/0126543 | A1* | 5/2016 | Ota | H01M 4/1393 |
| | | | | 429/231.95 |
| 2016/0172711 | A1* | 6/2016 | Yang | H01M 10/052 |
| | | | | 429/332 |
| 2017/0062869 | A1* | 3/2017 | Zhamu | H01M 4/133 |
| 2017/0207484 | A1* | 7/2017 | Zhamu | H01M 10/0525 |
| 2020/0106094 | A1 | 4/2020 | Ota et al. | |

FOREIGN PATENT DOCUMENTS

| | | | | |
|---|---|---|---|---|
| CN | 107732248 B | * | 11/2020 | ............. H01M 4/13 |
| JP | 2010-232469 A | | 10/2010 | |
| JP | 2011-44255 A | | 3/2011 | |
| JP | 2012-204306 A | | 10/2012 | |
| JP | 2012-204310 A | | 10/2012 | |
| JP | 2015122236 A | * | 7/2015 | |
| WO | WO-2016123168 A1 | * | 8/2016 | ............. H01G 11/06 |
| WO | WO 2017/026253 A1 | | 2/2017 | |
| WO | WO-2017090231 A1 | * | 6/2017 | ............. H01G 11/06 |

OTHER PUBLICATIONS

Office Action issued May 11, 2021 in corresponding Japanese Patent Application No. 2018-029684 (with English Translation), 6 pages.
International Search Report and Written Opinion issued Apr. 2, 2019 in PCT/JP2019/006574, (with English translation of International Search Report), 6 pages.
International Preliminary Report on Patentability and Written Opinion issued Sep. 3, 2020 in PCT/JP2019/006574 (submitting English translation only), 7 pages.
Extended European Search Report issued Nov. 26. 2021 in European Patent Application No. 19757268.8, 9 pages.
International Search Report issued on Apr. 2, 2019 in PCT/JP2019/006574 filed on Feb. 21, 2019, 1 page.
Office Action issued Sep. 1, 2023, in corresponding Chinese Patent Application No. 201980014665.9 (with English Translation), 17 pages.
Notice of Reasons for Rejection issued Mar. 23, 2024, in Chinese Patent Application No. 201980014665.9 (with machine English translation), 17 pages.

\* cited by examiner

PREDOPING METHOD FOR NEGATIVE ELECTRODE ACTIVE MATERIAL, MANUFACTURING METHOD FOR NEGATIVE ELECTRODE, AND MANUFACTURING METHOD FOR POWER STORAGE DEVICE

CROSS-REFERENCE TO RELATED APPLICATION

This international application claims the benefit of Japanese Patent Application No. 2018-029684 filed on Feb. 22, 2018 with the Japan Patent Office, and the entire disclosure of Japanese Patent Application No. 2018-029684 is incorporated herein by reference.

TECHNICAL FIELD

The present disclosure relates to a predoping method for a negative electrode active material, a manufacturing method for a negative electrode, and a manufacturing method for a power storage device.

BACKGROUND ART

A lithium-ion rechargeable battery generally comprises a positive electrode, a negative electrode, an electrolyte layer, and a battery case. The positive electrode and the negative electrode are connected to each other through the electrolyte layer. The positive electrode, the negative electrode, and the electrolyte layer are housed in the battery case. The positive electrode is formed by applying a positive electrode active material, and other components, to both surfaces of a positive electrode current collector using a binder. The negative electrode is formed by applying a negative electrode active material, and other components, to both surfaces of a negative electrode current collector using a binder. For the negative electrode active material, a negative electrode active material previously doped with lithium ions is used. Patent Document 1 discloses such a negative electrode active material previously doped with lithium ions.

PRIOR ART DOCUMENTS

Patent Documents

Patent Document 1: Japanese Unexamined Patent Application Publication No. 2012-204306

SUMMARY OF THE INVENTION

Problems to be Solved by the Invention

It has been found as a result of studies by the inventors that in a case where a power storage device, such as a lithium-ion rechargeable battery, is made using a negative electrode active material previously doped with lithium ions, large amounts of gases are generated during charge of the power storage device.

Generation of large amounts of gases during charge of the power storage device may disable keeping a constant distance between a positive electrode and a negative electrode, thereby causing variation in the distance. As a result, a degree of progress of battery reaction may vary in an in-plane direction of the power storage device, thus causing local degradation.

In one aspect of the present disclosure, it is preferable to provide a predoping method for a negative electrode active material, a manufacturing method for a negative electrode, and a manufacturing method for a power storage device that can reduce amounts of gases to be generated during charge of a power storage device.

Means for Solving the Problems

One aspect of the present disclosure provides a predoping method for a negative electrode active material to dope the negative electrode active material with lithium ions using an electrolyte solution that comprises lithium ions, in which the electrolyte solution comprises at least one type of additive having a reduction potential higher than a reduction potential of a solvent contained in the electrolyte solution.

A power storage device manufactured using a negative electrode active material subjected to the predoping method for a negative electrode active material in one aspect of the present disclosure can achieve reduction in amount of gas generated during charge of the power storage device.

Another aspect of the present disclosure provides a manufacturing method for a negative electrode. The method comprises: manufacturing a negative electrode active material doped with lithium ions by the predoping method for a negative electrode active material in one aspect of the present disclosure, and manufacturing a negative electrode using the negative electrode active material doped with lithium ions.

A power storage device manufactured using the negative electrode manufactured by the manufacturing method of a negative electrode in another aspect of the present disclosure can achieve reduction in amount of gas generated during charge of the power storage device.

A further aspect of the present disclosure provides a manufacturing method for a power storage device that comprises a positive electrode and a negative electrode. The method comprises manufacturing the negative electrode by the manufacturing method for a negative electrode in another aspect of the present disclosure.

A power storage device manufactured by the manufacturing method for a power storage device in the further aspect of the present disclosure is less likely to generate gas during charge of the power storage device.

EXPLANATION OF REFERENCE NUMERALS

1 . . . lithium-ion rechargeable battery, 3 . . . power generation element, 5 . . . exterior material, 5A, 5B . . . end portion, 7 . . . positive electrode current collector plate, 9 . . . negative electrode current collector plate, 11 . . . positive electrode, 13 . . . negative electrode, 15 . . . electrolyte layer, 17 . . . positive electrode current collector, 17A . . . end portion, 19 . . . positive electrode active material layer, 21 . . . negative electrode current collector, 21A . . . end portion, 23 . . . negative electrode active material layer

MODE FOR CARRYING OUT THE INVENTION

A description will be given of example embodiments of the present disclosure with reference to the drawings. In the description of the drawings, identical elements are denoted by identical reference numerals, and the same description thereof is not repeated. In the drawings, dimension ratios may be different from actual ratios due to exaggeration for convenience of description. As used herein, "potential" means "potential against lithium metal (vs. Li+/Li)" unless otherwise specified.

1. Predoping Method for Negative Electrode Active Material

A predoping method for a negative electrode active material of the present disclosure is a predoping method for a negative electrode active material in which the negative electrode active material is doped with lithium ions using an electrolyte solution that comprises lithium ions. The electrolyte solution comprises at least one type of additive. The at least one type of additive has a reduction potential higher than a reduction potential of a solvent contained in the electrolyte solution.

There is no particular limitation to the negative electrode active material. For example, any publicly-known negative electrode active material for a power storage device may be appropriately selected for use as the negative electrode active material. Examples of the negative electrode active material may include carbon material, lithium-transition metal composite oxide, metal material, and lithium alloy-based negative electrode material. Examples of carbon material may include graphite, such as artificial graphite, coated natural graphite, natural graphite; soft carbon; and hard carbon. Examples of lithium-transition metal composite oxide may include $Li_4T_{15}O_{12}$.

Two or more types of negative electrode active materials may be concurrently used. Carbon material and lithium-transition metal composite oxide are preferable as the negative electrode active material. Carbon material and lithium-transition metal composite oxide are excellent in terms of capacity and output characteristics.

There is no particular limitation to a volume average particle size (D50) of the negative electrode active material. The volume average particle size of the negative electrode active material is preferably 1 μm or more and 100 μm or less, and more preferably 5 μm or more and 30 μm or less. Herein, a value of the "volume average particle size of active material particles" means a value of 50% diameter in volume-based cumulative fraction that is obtained by a laser diffraction measurement method.

The negative electrode active material prior to lithium ion doping by the predoping method for a negative electrode active material of the present disclosure (hereinafter referred to as the "negative electrode active material prior to processing") may be not at all doped with lithium ions, or may be doped with lithium ions.

In a case where the negative electrode active material prior to processing has been doped with lithium ions, the negative electrode active material prior to processing preferably has a potential greater than a potential $E_{g(max)}$. The potential $E_{g(max)}$ is a potential at which an amount of gas generation is maximum when an initial doping of lithium ions is performed on the negative electrode active material prior to processing. When the negative electrode active material prior to processing has a potential greater than the potential $E_{g(max)}$, the predoping method for a negative electrode active material of the present disclosure exhibits a more remarkable effect.

Examples of a method for doping the negative electrode active material with lithium ions using an electrolyte solution that comprises lithium ions may include a slurry kneading method and an external short circuit method.

In the slurry kneading method, the negative electrode active material and lithium metal are dispersed in an electrolyte solution to prepare a slurry, and the prepared slurry is kneaded. In the slurry kneading method, an amount of lithium ions, for example, corresponding to the added amount of lithium metal is doped into the negative electrode active material. The slurry kneading method may be performed, for example, at a room temperature.

There is no particular limitation to a device for kneading the slurry. For example, a publicly-known kneader may be used as the device for kneading the slurry. Examples of the publicly-known kneader may include HIVIS MIX (produced by PRIMIX Corporation).

In the external short circuit method, a negative electrode active material layer is formed using the negative electrode active material. The negative electrode active material layer is also referred to as a "negative electrode mixture layer". The negative electrode active material layer, a separator, and a lithium metal layer are stacked in this order to form a stack. In the stack, the negative electrode active material and the lithium metal layer face each other through the separator. The negative electrode active material layer corresponds to a working electrode. Examples of the lithium metal layer may include lithium metal foil. The stack is held by and between paired current collectors to obtain a negative electrode half-cell. Examples of the current collector may include copper foil. An electrode lead is connected to each of the paired current collectors.

The negative electrode half-cell is enclosed in an outer packaging. The outer packaging is made of, for example, a laminate sheet. An end of the electrode lead is exposed out of the outer packaging. The electrolyte solution is filled in the outer packaging. Next, the outer packaging is vacuum sealed. An external short circuit is formed between the working electrode of the negative electrode half-cell and the lithium metal layer using a publicly-known charge and discharge device, to perform a charging process of the negative electrode active material layer. The working electrode of the negative electrode half-cell corresponds to the negative electrode active material layer. During this process, lithium ions are doped into the negative electrode active material.

According to the predoping method for a negative electrode active material of the present disclosure, doping of lithium ions into the negative electrode active material causes reduction in potential of the negative electrode active material, regardless of whether the slurry kneading method or the external short circuit method is employed. As the potential of the negative electrode active material is reduced, gases are generated from the negative electrode active material.

According to the predoping method for a negative electrode active material of the present disclosure, gases can be generated from the negative electrode active material during a process of doping lithium ions into the negative electrode active material (hereinafter referred to as a "predoping process"). Thus, it is possible to reduce the amounts of gases generated during a charging process of a power storage device that comprises the negative electrode active material.

There is no particular limitation to the additive if a condition is satisfied that the additive has a reduction potential higher than a reduction potential of a solvent contained in the electrolyte solution. Any additive may be appropriately selected based on publicly-known knowledge. In a case where the electrolyte solution comprises multiple solvents, it is preferable that the additive is a compound having a reduction potential higher than a reduction potential of any of the solvents.

Examples of such a compound having a reduction potential higher than the reduction potential of the solvent contained in the electrolyte solution may include vinylene carbonate, ethylene sulfite, and fluoroethylene carbonate.

The electrolyte solution comprises, relative to the electrolyte solution of 100 parts by mass, preferably an additive of 0.5 parts by mass or more and 50 parts by mass or less, more preferably an additive of 1 part by mass or more and 25 parts by mass or less, and further preferably an additive of 3 parts by mass or more and 20 parts by mass or less. In these cases, an improved charge-discharge efficiency can be obtained while achieving a reduced gas generation.

The electrolyte solution comprises a solvent. Examples of the solvent may include a solvent having lithium ion conductivity. The solvent is preferably an organic solvent, and is particularly preferably an aprotic organic solvent. Examples of the aprotic organic solvent may include ethylene carbonate, propylene carbonate, butylene carbonate, dimethyl carbonate, diethyl carbonate, methyl ethyl carbonate, γ-butyrolactone, acetonitrile, dimethoxycthan, tetrahydrofuran, dioxolane, methylene chloride, sulfolane. The aprotic organic solvent may be composed of a single component, or may be a mixed solvent composed of two or more types of components.

The electrolyte solution preferably comprises lithium salt. The lithium salt is dissolved in, for example, a solvent. Examples of an anionic moiety that forms lithium salt may include phosphorus anion having a fluoro group, such as $PF_6^-$, $PF_3(C_2F_5)_3^-$, and $PF_3(CF_3)_3^-$; boron anion having a fluoro group or a cyano group, such as $BF_4^-$, $BF_2(CF)_2^-$, $BF_3(CF_3)^-$, and $B(CN)_4^-$; sulfonyl imide anion having a fluoro group, such as $N(FSO_2)_2^-$, $N(CF_3SO_2)_2^-$, and $N(C_2F_5SO_2)_2^-$; and organic sulfonic acid anion having a fluoro group, such as $CF_3SO_3^-$. The electrolyte solution may comprise a single alkali metal salt, or may comprise two or more types of alkali metal salts. A lithium salt content, relative to the electrolyte solution of 100 parts by mass, is preferably 0.1 parts by mass or more and 50 parts by mass or less, more preferably 1 part by mass or more and 30 parts by mass or less, and further preferably 3 parts by mass or more and 20 parts by mass or less. The lithium salt content within the aforementioned range leads to excellent ion conductivity and cycle characteristics.

2. Negative Electrode Active Material Doped with Lithium Ions

A negative electrode active material doped with lithium ions of the present disclosure (hereinafter referred to as a "doped negative electrode active material") may be manufactured by, for example, the method described in "1. Predoping Method for Negative Electrode Active Material" above.

The doped negative electrode active material of the present disclosure may be one immediately after the predoping method of the present disclosure has completed, or may be one after a certain time has elapsed since completion of the predoping method.

3. Manufacturing Method for Negative Electrode and Power Storage Device

In a manufacturing method for a negative electrode of the present disclosure, a doped negative electrode active material is manufactured, and the manufactured doped negative electrode active material is used to manufacture a negative electrode. A method for manufacturing a doped negative electrode active material is the method described in "1. Predoping Method for Negative Electrode Active Material" section above.

A manufacturing method for a power storage device of the present disclosure is a manufacturing method for a power storage device that comprises a positive electrode and a negative electrode. In the manufacturing method for a power storage device of the present disclosure, the negative electrode is manufactured by the manufacturing method for a negative electrode of the present disclosure. Examples of the power storage device may include a lithium-ion rechargeable battery and a lithium ion capacitor. Examples of the power storage device may also include other types of rechargeable batteries and non-rechargeable batteries.

In the manufacturing method for a power storage device of the present disclosure, portions other than the negative electrode active material may be manufactured by, for example, a conventionally known manufacturing method. The power storage device manufactured by the manufacturing method for a power storage device of the present disclosure can be suitably used for, for example, a vehicle driving power source and an auxiliary power source that require high volume energy density and high volume output density. The power storage device manufactured by the manufacturing method for a power storage device of the present disclosure can be suitably used as, for example, a large-capacity power source for electric vehicles, hybrid electric vehicles, fuel cell vehicles, and hybrid fuel cell vehicles.

4. Configuration of Lithium-Ion Rechargeable Battery

The manufacturing method for a power storage device of the present disclosure enables manufacturing of, for example, a lithium-ion rechargeable battery. A cell provided in a lithium-ion rechargeable battery has high voltage. The cell provided in a lithium-ion rechargeable battery is, for example, a single cell layer. Thus, a lithium-ion rechargeable battery manufactured by the manufacturing method for a power storage device of the present disclosure achieves high energy density and high output density. The lithium-ion rechargeable battery manufactured by the manufacturing method of a power storage device of the present disclosure may be used for, for example, a drive power source of a vehicle, an auxiliary power source of a vehicle, a power source for a mobile device, such as a mobile phone.

There is no particular limitation to form or structure of a lithium-ion rechargeable battery manufactured by the manufacturing method for a power storage device of the present disclosure. In terms of form and structure, a lithium-ion rechargeable battery may be, for example, a stacked-type battery or a wound-type battery. The stacked-type battery is, for example, a flat battery. The wound-type battery is, for example, a cylindrical battery. The stacked-type battery can achieve long-term reliability by a simple sealing technique, such as thermocompression, and thus is excellent in cost and workability.

A lithium-ion rechargeable battery manufactured by the manufacturing method for a power storage device of the present disclosure may be a non-bipolar battery or a bipolar battery in terms of electrical connection form or electrode structure. The non-bipolar battery may be, for example, an internal parallel connection type battery. The bipolar battery may be, for example, an internal series connection type battery.

Examples of the lithium-ion rechargeable battery manufactured by the manufacturing method for a power storage device of the present disclosure may include a solution electrolyte type battery and a polymer battery. In the solution electrolyte type battery, a solution electrolyte is used for the electrolyte layer. Examples of the solution electrolyte may include non-aqueous electrolyte solution.

In the polymer battery, a polymer electrolyte is used for the electrolyte layer. Examples of the polymer battery may include a gel electrolyte battery and a solid polymer battery. The gel electrolyte battery is a battery in which a polymer gel electrolyte (also simply referred to as a "gel electrolyte") is used. The solid polymer battery is, for example, a full solid battery. The solid polymer battery is a battery in which a polymer solid electrolyte (also simply referred to as a "polymer electrolyte") is used.

A description will be given of one example of a lithium-ion rechargeable battery manufactured by the manufacturing method for a power storage device of the present disclosure with reference to FIG. 1. This lithium-ion rechargeable battery is of a non-bipolar type, and of an internal parallel connection type.

It is to be noted that a lithium-ion rechargeable battery manufactured by the manufacturing method for a power storage device of the present disclosure is not limited to that described below.

<Overall Configuration of Lithium-Ion Rechargeable Battery 1>

Figure 1:
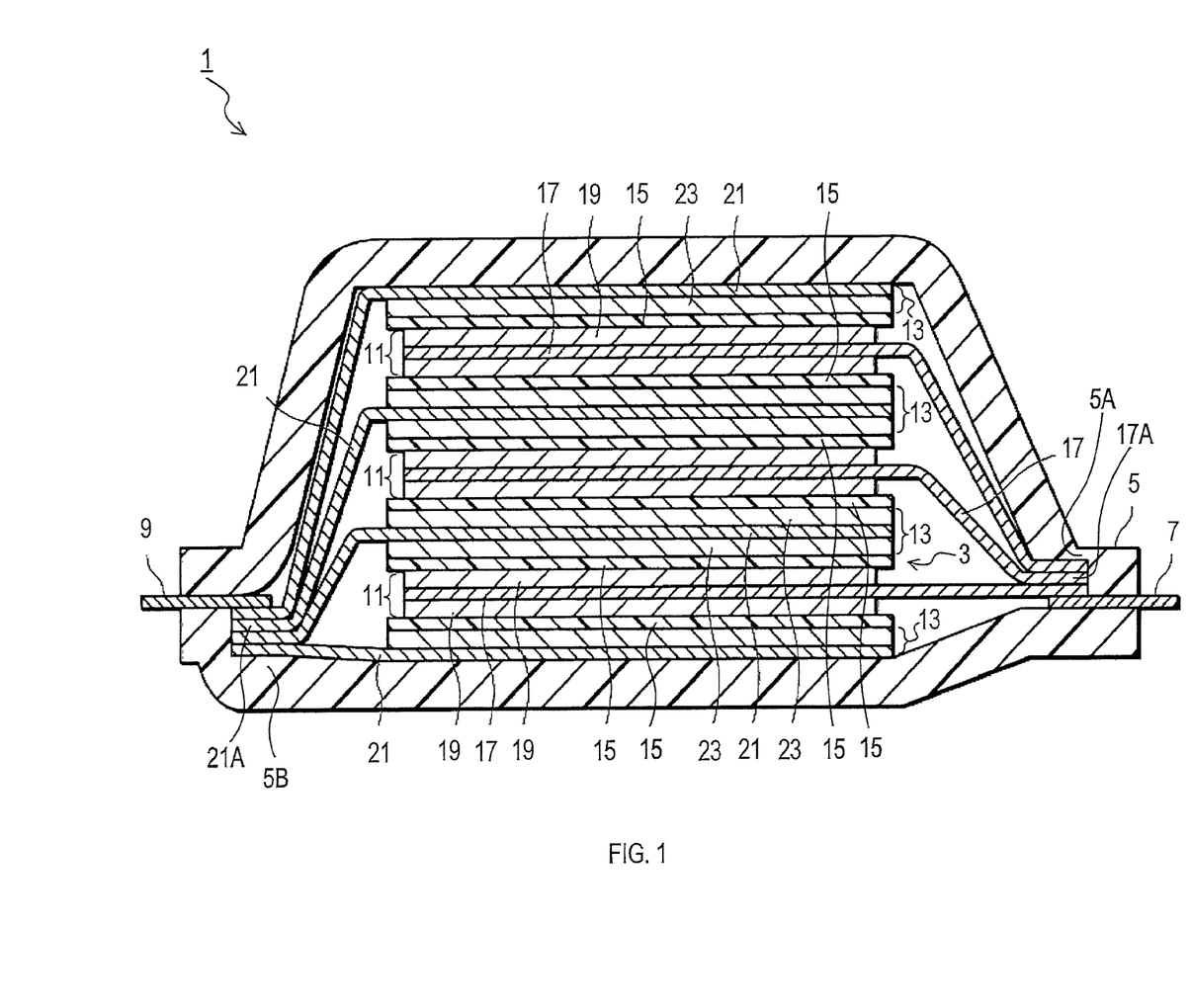
FIG. 1 is a side sectional view showing a configuration of a lithium-ion rechargeable battery.

As shown in FIG. 1, a lithium-ion rechargeable battery 1 comprises a power generation element 3, an exterior material 5, a positive electrode current collector plate 7, and a negative electrode current collector plate 9.

The power generation element 3 comprises several stacked units, and each of the units is formed by a positive electrode 11, an electrolyte layer 15, and a negative electrode 13 that are stacked in this order. The positive electrode 11 comprises a positive electrode current collector 17 and positive electrode active material layers 19 formed on both surfaces of the positive electrode current collector 17. The negative electrode 13 comprises a negative electrode current collector 21 and negative electrode active material layers 23 formed on both surfaces of the negative electrode current collector 21.

The exterior material 5 encapsulates the power generation element 3. An end portion 17A of each positive electrode current collector 17 at one side is held by an end portion 5A of the exterior material 5. An end portion 21A of each negative electrode current collector 21 at the other side opposite to the one side is held by an end portion 5B of the exterior material 5.

One end of the positive electrode current collector plate 7 is held by the end portion 5A and is electrically conductive with the end portion 17A. The other end of the positive electrode current collector plate 7 is exposed out of the exterior material 5. One end of the negative electrode current collector plate 9 is held by the end portion 5B, and is conductive with the end portion 21A. The other end of the negative electrode current collector plate 9 is exposed out of the exterior material 5.

In FIG. 1, the negative electrode 13 located uppermost and the negative electrode 13 located lowermost are each provided with the negative electrode active material layer 23 only on one surface of the negative electrode current collector 21, but may be provided with the negative electrode active material layers 23 on both surfaces of the negative electrode current collector 21.

Also, in FIG. 1, positions of the negative electrodes 13 and positions of the positive electrode 11 may be exchanged. In this case, in FIG. 1, the positive electrodes 11 are located at an uppermost position and a lowermost position of the power generation element 3. The positive electrodes 11 located at the uppermost position and the lowermost position each may be provided with the positive electrode active material layer 19 only on one surface of the positive electrode current collector 17, or each may be provided with the positive electrode active material layers 19 on both surfaces of the positive electrode current collector 17.

<Configuration of Positive Electrode Active Material Layer 19>

The positive electrode active material layer 19 comprises a positive electrode active material. Examples of the positive electrode active material may include lithium-transition metal composite oxide, lithium-transition metal phosphate compound, and lithium-transition metal sulfate compound. Examples of the lithium-transition metal composite oxide may include $LiMn_2O_4$, $LiCoO_2$, $LiNiO_2$, and $Li(Ni-Mn-Co)O_2$. Also, the lithium-transition metal composite oxide may be one in which a part of a transition metal in any of the aforementioned lithium-transition metal composite oxides is substituted with another element.

Two or more types of positive electrode active materials may be concurrently used. Lithium-transition metal composite oxides are excellent in terms of capacity and output characteristics. Among lithium-transition metal composite oxides, a lithium-transition metal composite oxide containing lithium and nickel is preferable. Among lithium-transition metal composite oxides, an NMC composite oxide is more preferable. In an NMC composite oxide, a part of the transition metal in $Li(Ni-Mn-Co)O_2$ or $Li(Ni-Mn-Co)O_2$ is substituted with another metal element.

An NMC composite oxide has a layered crystal structure in which a lithium atom layer and a transition metal atom layer are alternately stacked through an oxygen atom layer. In an NMC composite oxide, Mn, Ni, and Co are arranged in order. An NMC composite oxide contains one Li atom per atom of transition metal. Thus, an amount of Li that can be obtained from an NMC composite oxide is double an amount of Li that can be obtained from a spinel lithium manganese oxide. That is, a Li supply capacity of an NMC composite oxide is double a Li supply capacity of a spinel lithium manganese oxide. Thus, an NMC composite oxide can achieve a high capacity.

As described above, an NMC composite oxide includes a composite oxide in which a part of the transition metal element is substituted with another metal element. Examples of the metal element to be substituted for a part of the transition metal element may include Ti, Zr, Nb, W, P, Al, Mg, V, Ca, Sr, Cr, Fe, B, Ga, In, Si, Mo, Y, Sn, V, Cu, Ag, and Zn. Preferable examples of the metal elements to be substituted for a part of the transition metal element may include Ti, Zr, Nb, W, P, Al, Mg, V, Ca, Sr, and Cr. More preferable metal elements to be substituted for a part of the transition metal element are Ti, Zr, P, Al, Mg, and Cr. Particularly preferable metal elements to be substituted for a part of the transition metal element are Ti, Zr, Al, Mg, and Cr. In a case where a metal element to be substituted for a part of the transition metal element is Ti, Zr, Al, Mg, or Cr, the lithium-ion rechargeable battery 1 can achieve an improved cycle characteristics.

An NMC composite oxide preferably has a composition represented by general formula (1): $Li_aNi_bMn_cCo_dM_xO_2$. In general formula (1), a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one metal element selected from a group consisting of Ti, Zr, Nb, W, P, Al, Mg, V, Ca, Sr, and Cr.

In the formula, "a" represents an atomic ratio of Li, "b" represents an atomic ratio of Ni, "c" represents an atomic ratio of Mn, "d" represents an atomic ratio of Co, and "x" represents an atomic ratio of M. A composition of these elements is a value measured by a plasma (ICP) emission analysis method.

The NMC composite oxide represented by general formula (1) has a high theoretical discharge capacity. General formula (1) preferably satisfies $0.4 \leq b \leq 0.6$. In this case, the lithium-ion rechargeable battery 1 achieves good cycle characteristics.

Nickel (Ni), cobalt (Co), and manganese (Mn) lead to an improved purity of the NMC composite oxide, thereby achieving an improved electronic conductivity. Accordingly, containing one of nickel (Ni), cobalt (Co), and manganese (Mn) will lead to improved capacity and output characteristics of the lithium-ion rechargeable battery 1.

"M" in general formula (1) represents a metal element that is substituted for a part of the transition metal in a crystal lattice of the NMC composite oxide. In a case where a part of the transition element is substituted with "M" in the NMC composite oxide, the lithium-ion rechargeable battery 1 has improved cycle characteristics. In particular, general formula (1) preferably satisfies $0 < x \leq 0.3$. Solid solution of "M" leads to a stabilized crystal structure of the NMC composite oxide. Thus, despite repeated charge and discharge, it is possible to inhibit reduction in capacity of the lithium-ion rechargeable battery 1, and to achieve excellent cycle characteristics.

In general formula (1), "b", "c", and "d" preferably satisfy $0.44 \leq b \leq 0.51$, $0.27 \leq c \leq 0.31$, and $0.19 \leq d \leq 0.26$. In this case, an improved balance can be achieved between the capacity and lifetime characteristics of the lithium-ion rechargeable battery 1.

For example, $LiNi_{0.5}Mn_{0.3}Co_{0.2}O_2$ has a high capacity per unit mass and a high energy density, as compared with $LiCoO_2$, $LiMn_2O_4$, $LiNi_{1/3}Mn_{1/3}Co_{1/3}O_2$, and the like, which have been employed in common consumer batteries. Thus, use of $LiNi_{0.5}Mn_{0.3}Co_{0.2}O_2$ will lead to manufacturing of the lithium-ion rechargeable battery 1 in a compact size with a high capacity. For example, if $LiNi_{0.5}Mn_{0.3}Co_{0.2}O_2$ is employed for the lithium-ion rechargeable battery 1 to be used in vehicles, then the vehicles can achieve an increased cruising range. Also, $LiNi_{0.5}Mn_{0.3}Co_{0.2}O_2$ has lifetime characteristics similar to those of $LiNi_{1/3}Mn_{1/3}Co_{1/3}O_2$.

Further, $LiNi_{0.8}Co_{0.1}Al_{0.1}O_2$ has a capacity per unit mass that is higher than a capacity per unit mass of $LiNi_{0.5}Mn_{0.3}Co_{0.2}O_2$. The positive electrode active material may be other than the aforementioned.

There is no particular limitation to a volume average particle size (D50) of the positive electrode active material. The volume average particle size of the positive electrode active material is preferably 1 μm or more and 30 μm or less, and more preferably 5 μm or more and 20 μm or less. If the volume average particle size of the positive electrode active material is within these ranges, then the lithium-ion rechargeable battery 1 can achieve high output.

The positive electrode active material layer 19 may comprise, for example, a binder, a conduction aid, a lithium salt, and an ion conductive polymer.

The binder binds the positive electrode active materials together, or the positive electrode active material and the current collector, to hold an electrode structure of the positive electrode 11. There is no particular limitation to the binder. Examples of the binder may include thermoplastic polymer, such as polyethylene, polypropylene, polyethylene terephthalate (PET), polyether nitrile (PEN), polyacrylonitrile, polyimide, polyamide, polyamidimide, cellulose, carboxymethyl cellulose (CMC), ethylene-vinyl acetate, copolymer, polyvinyl chloride, styrene-butadiene rubber (SBR), isoprene rubber, butadiene rubber, ethylene-propylene rubber, ethylene-propylene-diene copolymer, styrene-butadiene-styrene block copolymer and hydrogenated product thereof, and styrene-isopren-styrene block copolymer and hydrogenated product thereof; fluororesin, such as polyvinylidene fluoride (PVdF), polytetrafluoroethylene (PTFE), tetrafluoroethylene-hexafluoropropylene copolymer (FEP), tetrafluoroethylene-perfluoroalkyl vinyl ethercopolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF); vinylidene fluoride-based fluororubber, such as vinylidene fluoride-hexafluoropropylene-based fluororubber (VDF-HFP-based fluororubber), vinylidene fluoride-hexafluoropropylene-tetrafluoro ethylene-based fluororubber (VDF-HFP-TFE-based fluororubber), vinylidene fluoride-pentafluoropropylene-based fluororubber (VDF-PFP-based fluororubber), vinylidene fluoride-pentafluoropropylene-tetrafluoro ethylene-based fluororubber (VDF-PFP-TFE-based fluororubber), vinylidene fluoride-perfluoromethyl vinyl ether-tetrafluoroethylene-based fluororubber (VDF-PFMVE-TFE-based fluororubber), vinylidene fluoride-chlorotrifluoroethylene-based fluororubber (VDF-CTFE-based fluororubber); and epoxy resin.

Particularly preferable binders are polyvinylidene fluoride, polyimide, styrene-butadiene rubber, carboxymethyl cellulose, polypropylene, polytetrafluoroethylene, polyacrylonitrile, polyamide, and polyamidimide. These preferable binders have high thermostability, have a very wide potential window, and are stable with respect to both positive electrode potential and negative electrode potential. One type of binder may be used singly, or two types of hinders may be used concurrently.

There is no limitation to a binder amount to be contained in the positive electrode active material layer 19, if the binder amount allows binding of the active material. The binder amount is preferably 0.5% by mass or more and 15% by mass or less, and more preferably 1% by mass or more and 10% by mass or less, relative to a mass of the positive electrode active material layer 19.

The conduction aid is an additive that improves conductivity of the positive electrode active material layer 19. Examples of the conduction aid may include carbon materials, such as carbon black including acetylene black, graphite, and vapor-grown carbon fiber. If the positive electrode active material layer 19 comprises the conduction aid, an electronic network is formed effectively in the positive electrode active material layer 19, leading to improved output characteristics of the lithium-ion rechargeable battery 1.

A content of the conduction aid relative to a total amount of the positive electrode active material layer is in a range of preferably 1% by mass or more, more preferably 3% by mass or more, and further preferably 5% by mass or more. Also, the content of the conduction aid relative to the total amount of the positive electrode active material layer is in a range of preferably 15% by mass or less, more preferably 10% by mass or less, and further preferably 7% by mass or less.

The positive electrode active material layer 19 may comprise, for example, a conductive binder that has a function of a conduction aid and a function of a binder. The positive electrode active material layer 19 may comprise a conductive binder and a conduction aid and/or a binder. Examples of the conductive binder may include commercially available TAB-2 (produced by Hohsen Corporation).

Examples of lithium salt may include inorganic acid lithium salt, such as $LiPF_6$, $LiBF_4$, $LiSbF_6$, $LiAsF_6$, and $LiClO_4$; and organic acid lithium salt, such as $LiN(CF_3SO_2)_2$, $LiN(C_2F_5SO_2)_2$, and $LiC(CF_3SO_2)_3$. Among these, $LiPF_6$ is preferable. Use of $LiPF_6$ will lead to improved battery output and improved charge and discharge cycle characteristics of the lithium-ion rechargeable battery 1.

Examples of ion conductive polymer may include polyethylene oxide (PEO)-based polymer and polypropylene oxide (PPO)-based polymer.

Examples of a method for forming the positive electrode active material layer 19 may include a method for applying or coating a slurry, a kneading method, a sputtering method, a vapor deposition method, a CVD method, a PVD method, an ion plating method, and a thermal spraying method.

There is no particular limitation to a thickness of the positive electrode active material layer 19. The thickness of the positive electrode active material layer 19 may be appropriately specified based on, for example, publicly-known knowledge. For example, in consideration of intended use and ion conductivity of the lithium-ion rechargeable battery 1, the thickness of the positive electrode active material layer 19 may be specified as 1 μm or more and 500 μm or less, and preferably as 2 μm or more and 300 μm or less. Examples of the intended use of the lithium-ion rechargeable battery 1 may include an intended use focusing on output and an intended use focusing on energy.

<Configuration of Negative Electrode Active Material Layer 23>

The negative electrode active material layer 23 comprises a negative electrode active material. At least a part of the negative electrode active material is doped with lithium ions by the predoping method for a negative electrode active material described in "1. Predoping Method for Negative Electrode Active Material" section above.

The negative electrode active material contained in the negative electrode active material layer 23 may be entirely doped with lithium ions, or the negative electrode active material contained in the negative electrode active material layer 23 may be partially not doped with lithium ions.

Relative to a total mass of the negative electrode active material contained in the negative electrode active material layer 23, a mass ratio (hereinafter referred to as a "doping ratio") of the negative electrode active material doped with lithium ions is preferably 50% by mass or more, more preferably 70% by mass or more, further preferably 85% by mass or more, further more preferably 90% by mass or more, particularly preferably 95% by mass or more, and most preferably 100% by mass.

In a case where the power generation element 3 comprises two or more negative electrode active material layers 23, it is sufficient that at least one of the negative electrode active material layers 23 comprises a negative electrode active material doped with lithium ions. It is preferable that all of the negative electrode active material layers 23 each comprise a negative electrode active material doped with lithium ions.

There is no particular limitation to a mass ratio of the negative electrode active material relative to a total mass of the negative electrode active material layers 23. The mass ratio of the negative electrode active material relative to the total mass of the negative electrode active material layers 23 is preferably 80% by mass or more and 100% by mass or less, and more preferably 90% by mass or more and 99% by mass or less.

The negative electrode active material layer 23 may comprise, for example, a conductive member, a lithium salt, an ion conductive polymer, a binder, and so on, in addition to the negative electrode active material. Types and amounts of the lithium salt and the ion conductive polymer contained in the negative electrode active material layer 23 may be, for example, the same as types and amounts of the lithium salt and the ion conductive polymer contained in the positive electrode active material layer 19.

The conductive member has a function of forming an electronic conduction path in the negative electrode active material layer 23. For example, at least a part of the conductive member can form an electronic conduction path that electrically connects a first main surface of the negative electrode active material layer 23 to a second main surface of the negative electrode active material layer 23. The first main surface is a surface that contacts the electrolyte layer 15. The second main surface is a surface that contacts the negative electrode current collector 21.

If the conductive member forms the electronic conduction path in the negative electrode active material layer 23, an electron transfer resistance along a thickness direction of the negative electrode active material layer 23 can be reduced. As a result, improved high-rate output characteristics of the lithium-ion rechargeable battery 1 can be achieved. Whether at least a part of the conductive member forms the electronic conduction path may be confirmed by observing a section of the negative electrode active material layer 23 using an SEM or an optical microscope.

The conductive member is preferably a conductive fiber having a fibrous configuration. Specific examples of the conductive member may include carbon fiber, such as PAN carbon fiber and pitch carbon fiber; conductive fiber in which high conductive metal or graphite is evenly dispersed in synthetic fiber; metal fiber obtained by fiberizing metal, such as stainless steel; conductive fiber in which a surface of organic fiber is coated with metal; and conductive fiber in which a surface of organic fiber is coated with resin that contains a conductive substance. Among these, carbon fiber is preferable. Carbon fiber is highly conductive and light-weight. Carbon black, such as acetylene black, may be used for the conductive member.

Relative to a mass of an entire solid content of the negative electrode active material layer 23, a mass ratio of the conductive member is preferably 0.5% by mass or more and 20% by mass or less, and more preferably 1% by mass or more and 10% by mass or less. If the mass ratio of the conductive member is within the aforementioned range, then an electronic conduction path can be suitably formed in the negative electrode active material layer 23, and reduction in energy density of the lithium-ion rechargeable battery 1 can be inhibited.

Examples of the binder contained in the negative electrode active material layer 23 may include solvent-based binder, such as polyvinylidene fluoride (PVdF), and aqueous binder, such as styrene-butadiene rubber (SBR).

The negative electrode active material layer 23 may comprise components other than the aforementioned components. However, a content of any component that is less likely to contribute to progress of charge and discharge reaction is preferably small. For example, a content of the binder is preferably small. Relative to the mass of the entire solid content contained in the negative electrode active material layer 23, the content of the binder is preferably 1% by mass or less, more preferably 0.5% by mass or less, further preferably 0.2% by mass or less, particularly preferably 0.1% by mass or less, and most preferably 0% by mass.

There is no particular limitation to a thickness of the negative electrode active material layer 23. The thickness of the negative electrode active material layer 23 may be appropriately specified based on, for example, publicly-known knowledge. For example, in consideration of intended use and ion conductivity of the lithium-ion rechargeable battery 1, the thickness of the negative electrode active material layer 23 may be specified as 1 μm or more and 500 μm or less, and preferably as 2 μm or more and 300 μm or less. Examples of the intended use of the lithium-ion rechargeable battery 1 may include an intended use focusing on output and an intended use focusing on energy.

<Configuration of Current Collector>

Hereinafter, the positive electrode current collector 17 and the negative electrode current collector 21 are collectively referred to as a "current collector". The current collector is formed of a conductive material. The current collector has a size determined based on the intended use of the lithium-ion rechargeable battery 1. For example, the current collector to be used for the lithium-ion rechargeable battery 1 having a large size and required to have high energy density has a large area.

There is no particular limitation to a thickness of the current collector. The thickness of the current collector is usually approximately 1 μm or more and 100 μm or less. There is no particular limitation to a shape of the current collector. Examples of the current collector may include a current collector foil and a mesh-shaped current collector. Examples of the mesh-shaped current collector may include an expanded grid. In a case where the negative electrode active material layer 23 made of thin film alloy is formed directly on the negative electrode current collector 21 by, for example, the sputtering method, the negative electrode current collector 21 is preferably a current collector foil.

There is no particular limitation to a material for forming the current collector. Examples of the material for forming the current collector may include metal, conductive polymeric material, and resin made of a non-conductive polymeric material and an added conductive filler.

Examples of the metal for forming the current collector may include aluminum, nickel, iron, stainless steel, titanium, and copper. Examples of the material for forming the current collector may include a clad material of nickel and aluminum, a clad material of copper and aluminum, and a plated material of a combination of any of the aforementioned metals. Examples of the material for forming the current collector may include a foil in which a metal surface is coated with aluminum. Aluminum, stainless steel, copper, and nickel are preferable for the material for forming the current collector. If aluminum, stainless steel, copper, or nickel is used as the material for forming the current collector, then electronic conductivity of the current collector is improved, a battery operating potential is reduced, and an improved adhesion between the negative electrode active material layer 23 and the negative electrode current collector 21 can be achieved when the negative electrode active material layer 23 is formed by sputtering.

Examples of the conductive polymeric material may include polyaniline, polypyrrole, polythiophene, polyacetylene, polyparaphenylene, polyphenylene vinylene, polyacrylonitrile, and polyoxadiazole. These conductive polymeric materials have sufficient conductivity without adding, for example, a conductive filler. Thus, in a case where a conductive polymeric material is used as the material for forming the current collector, a simplified manufacturing process of the current collector can be achieved, and weight reduction of the current collector can be achieved.

Examples of the non-conductive polymeric material may include polyethylene (PE), polypropylene (PP), polyethylene terephthalate (PET), polyether nitrile (PEN), polyimide (PI), polyamidimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Examples of polyethylene may include high-density polyethylene (HDPE) and low-density polyethylene (LDPE). These non-conductive polymeric materials have excellent potential resistance and solvent resistance.

A conductive filler may be added to the aforementioned conductive polymeric material or non-conductive polymeric material when needed. In particular, in a case where resin as a base material for the current collector is made of non-conductive polymer only, it is preferable to add a conductive filler to provide conductivity to the current collector.

There is no particular limitation to the conductive filler as long as a substance having conductivity is employed. The conductive filler may be, for example, a material that is excellent in conductivity, resistance to potential, or lithium ion insulation performance. Examples of the conductive filler may include metal and conductive carbon. There is no particular limitation to the type of metal. The metal may be, for example, at least one type of metal selected from a group consisting of Ni, Ti, Al, Cu, Pt, Fe, Cr, Sn, Zn, In, Sb, and K, or an alloy containing these metals. Examples of the conductive filler may include metal oxides of any of the aforementioned metals.

There is no particular limitation to the conductive carbon. The conductive carbon may be, for example, at least one type selected from a group consisting of acetylene black, Vulcan, Black Pearl, carbon nanofiber, Ketjen black, carbon nanotube, carbon nanohorn, carbon nanoballoon, and fullerene.

There is no particular limitation to an adding amount of the conductive filler, as long as the amount is sufficient to provide adequate conductivity to the current collector. The adding amount of the conductive filler is typically 5% by mass or more and 35% by mass or less, relative to a total mass of the current collector.

<Configuration of Electrolyte Layer 15>

Examples of the electrolyte to form the electrolyte layer 15 may include liquid electrolyte and polymer electrolyte. In a liquid electrolyte, a lithium salt is dissolved in an organic solvent. The lithium salt corresponds to an electrolyte salt. Examples of the organic solvent may include carbonates, such as ethylene carbonate, propylene carbonate, butylene carbonate, vinylene carbonate, dimethyl carbonate, diethyl carbonate, ethyl methyl carbonate, methyl propyl carbonate. The aforementioned organic solvents each may be used alone, or may be used in combination of two or more.

Examples of the lithium salt may include $Li(CF_3SO_2)_2N$, $Li(C_2F_5SO_2)_2N$, $LiPF_6$, $LiBF_4$, $LiAsF_6$, $LiTaF_6$, $LiClO_4$, and $LiCF_3SO_3$. The lithium salt may be, for example, a compound that may be added to an active material layer of an electrode.

The polymer electrolyte is classified into a gel electrolyte including an electrolyte solution and a true polymer electrolyte not including an electrolyte solution. The gel electrolyte has a configuration in which the liquid electrolyte is poured into a matrix polymer that comprises an ion conductive polymer. In a case of using a gel electrolyte as the electrolyte, fluidity of the electrolyte is reduced. This facilitates reduction in ion conduction between layers provided in the lithium-ion rechargeable battery 1.

Examples of the matrix polymer may include polyalkylene oxide-based polymer. Examples of the polyalkylene oxide-based polymer may include polyethylene oxide (PEO), polypropylene oxide (PPO), and copolymers thereof. Polyalkylene oxide-based polymers sufficiently dissolve electrolyte salts, such as lithium salt.

There is no particular limitation to a mass ratio of the liquid electrolyte relative to a total mass of the gel electrolyte. The mass ratio of the liquid electrolyte relative to the total mass of the gel electrolyte is preferably in a range of several percent by mass or more and 98% by mass or less, and more preferably in a range of 70% by mass or more and 98% by mass or less. In a case where the mass ratio of the liquid electrolyte relative to the total mass of the gel electrolyte is within the aforementioned range, the electrolyte layer 15 has an increased ion conductivity.

In a case where the electrolyte layer 15 is formed of a liquid electrolyte or a gel electrolyte, the electrolyte layer 15 may comprise a separator. Examples of the separator may include non-woven cloth, fine porous film, and porous flat sheet. The porous flat sheet is formed of, for example, polyolefin, such as polyethylene and polypropylene.

The matrix polymer of the gel electrolyte may exhibit a high mechanical strength by forming a crosslinked structure. In a method for forming a crosslinked structure in the matrix polymer, for example, a polymerizable polymer for forming a polymer electrolyte and a suitable polymerization starter are added to the matrix polymer. Then, a polymerization process, such as thermal polymerization, ultraviolet polymerization, radiation polymerization, and electron beam polymerization, is performed. Examples of the polymerizable polymer for forming a polymer electrolyte may include PEO and PPO.

<Current Collector Plate>

The positive electrode current collector plate 7 and the negative electrode current collector plate 9 are collectively referred to as a "current collector plate". The current collector plate has a function to take out electric current out of the lithium-ion rechargeable battery 1.

There is no limitation to a material for forming the current collector plate. Examples of the material for forming the current collector plate may include publicly-known high conductive materials that have been conventionally used for a current collector plate for the lithium-ion rechargeable battery 1. The material for forming the current collector plate is preferably, for example, aluminum, copper, titanium, nickel, stainless steel (SUS), or an alloy thereof, and more preferably aluminum or copper. Aluminum and copper are lightweight, highly corrosion resistant, and highly conductive. A material for forming the positive electrode current collector plate 7 and a material for forming the negative electrode current collector plate 9 may be the same or different.

The lithium-ion rechargeable battery 1 may comprise a positive electrode terminal lead and a negative electrode terminal lead. Example of materials for the positive electrode terminal lead and the negative electrode terminal lead may include materials for a terminal lead used in publicly-known lithium-ion rechargeable batteries.

Each exposed portion, out of the exterior material 5, of the current collector plate, the positive electrode terminal lead, and the negative electrode terminal lead is preferably covered with, for example, a heat shrink tube having heat-resistant and insulating properties. In this case, if the current collector plate, the positive electrode terminal lead, or the negative electrode terminal lead contacts any peripheral device, wiring, or other components, it is possible to reduce electric leakage and influence on the peripheral device. Examples of the peripheral device may include automobile parts and electronic devices.

<Exterior Material 5>

Examples of the exterior material 5 may include a metal can case and a bag-shaped case. The bag-shaped case may be, for example, a bag-shaped case made of a laminate film. The bag-shaped case made of a laminate film allows the lithium-ion rechargeable battery 1 to achieve increased output, and has an excellent cooling performance. The bag-shaped case made of a laminate film can be suitably used for a battery for large devices for an EV and an HEV.

The laminate film may be, for example, a laminate film that includes an aluminum layer. The laminate film may be, for example, a three-layer laminate film formed of a PP layer, an aluminum layer, and a nylon layer that are stacked in this order.

<Outer Appearance of Lithium-ion Rechargeable Battery 1>

Figure 2:
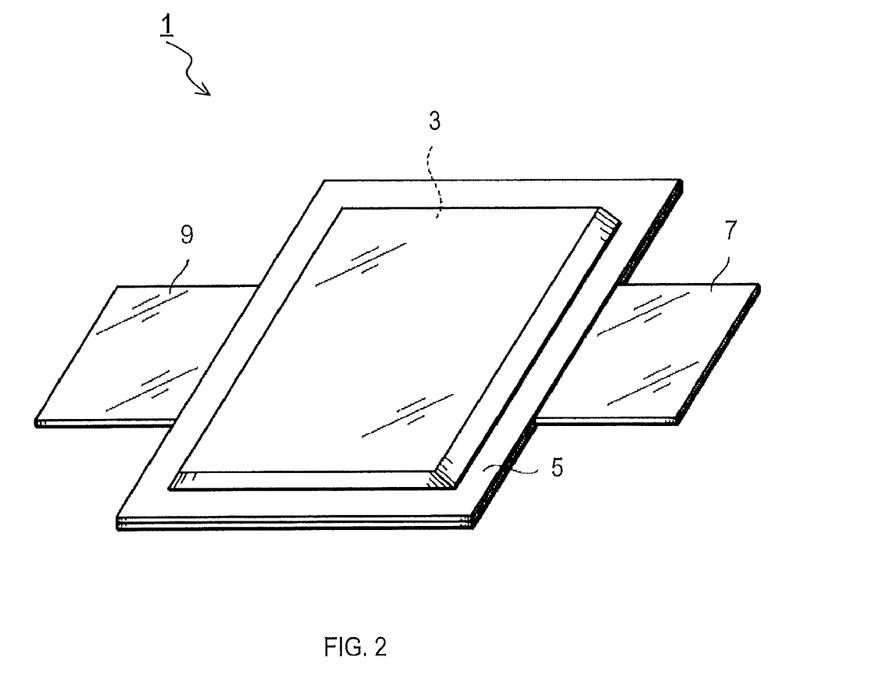
FIG. 2 is a perspective view showing an outer appearance of the lithium-ion rechargeable battery.

FIG. 2 is a perspective view showing an outer appearance of the lithium-ion rechargeable battery 1. The lithium-ion rechargeable battery 1 is a stacked-type flat lithium-ion rechargeable battery. The lithium-ion rechargeable battery 1 has a rectangular flat shape.

The positive electrode current collector plate 7 and the negative electrode current collector plate 9 to take out electric power therethrough are led out from both sides of the lithium-ion rechargeable battery 1. The power generation element 3 is enveloped by the exterior material 5. Peripheral portions of the exterior material 5 are heat welded. Thus, the power generation element 3 is sealed with the exterior material 5.

The lithium-ion rechargeable battery 1 is not limited to a stacked-type flat battery (for example, a laminate cell). Examples of the lithium-ion rechargeable battery 1 may include a wound-type battery. Examples of the wound-type battery may include a cylindrical battery (for example, a coin cell), a prismatic battery (for example, a prismatic cell), a rectangular flat battery formed by deformation of a cylindrical battery, and a cylinder-shaped cell.

The aforementioned cylindrical battery and prismatic battery each may comprise a laminate film or a metal can as the exterior material. The power generation element is preferably covered with an exterior material made of an aluminum laminate film. In this case, the lithium-ion rechargeable battery 1 can be lightweight.

There is no particular limitation to the manner of leading out the positive electrode current collector plate 7 and the negative electrode current collector plate 9 from the exterior material 5. For example, the positive electrode current collector plate 7 and the negative electrode current collector plate 9 may be led out from a same side of the exterior material 5. Alternatively, the positive electrode current collector plate 7 and the negative electrode current collector plate 9 each may be divided into portions, and a part of the divided portions of the current collector plate may be led out from corresponding sides of the exterior material 5. When the lithium-ion rechargeable battery 1 is a wound-type battery, a terminal may be formed by using the exterior material made of a metal can.

5. Examples

The present disclosure will be described further in detail using Examples and Comparative Examples below.

[Measurement of Reduction Potential]

A reduction potential is obtained by a cyclic voltammogram. The cyclic voltammogram is obtained by cyclic voltammetry measurement.

Specifically, a reduction potential of each compound is measured as described below. $LiClO_4$ is dissolved in propylene carbonate to prepare an electrolyte solution. $LiClO_4$ is an electrolyte salt. A concentration of $LiClO_4$ in the electrolyte solution is 1M. Next, 3 parts by mass of a measurement target compound is added to 100 parts by mass of the electrolyte solution to prepare an electrolyte solution.

Then, the aforementioned electrolyte solution including an additive is added to a tripolar cell in which a graphite negative electrode is used as a working electrode, and lithium metal is used as a counter electrode and a reference electrode to form an electrochemical cell. Measurement is made of an electric current value when potential of the working electrode is changed from an open circuit potential to a lower potential at a scanning speed of 0.1 mV/sec.

Also, similar measurement of an electric current value is made with respect to an electrochemical cell that has basically the same configuration as that of the aforementioned electrochemical cell, but is formed by adding an electrolyte solution not containing the measurement target compound, instead of the electrolyte solution containing the measurement target compound, and an obtained measured value is regarded as a blank value. It was confirmed based on the measured value that propylene carbonate had a reduction potential of 0.8 V (vs. Li+/Li).

Among peaks of reductive decomposition characteristically observed when the electrolyte solution containing the measurement target compound is used, a potential at the highest peak is regarded as a reduction potential of the additive. As a result of measuring respective reduction potentials of the measurement target compounds used in below-described Examples and Comparative Examples, ethylene carbonate had a reduction potential of 0.6 V (vs. Li+/Li), fluoroethylene carbonate had a reduction potential of 1.15 V (vs. Li+/Li), and vinylene carbonate had a reduction potential of 1.35 V (vs. Li+/Li).

(5-1) Example 1

(i) Formation of Negative Electrode Sample

Hard carbon as a negative electrode active material and an electrolyte solution were mixed in a glove box having a dew point of −80° C., and then lithium metal powder was added at room temperature, to thereby prepare a negative electrode active material slurry. The negative electrode active material slurry has a composition in which the negative electrode active material and the metal lithium powder are dispersed in the electrolyte solution.

The electrolyte solution comprises an organic solvent, lithium hexafluorophosphate ($LiPF_6$), and fluoroethylene carbonate. Fluoro ethylene carbonate corresponds to an additive. A concentration of lithium hexafluorophosphate in the electrolyte solution is 1 mol/L. Lithium fluorophosphate is dissolved in the organic solvent. 100 parts by mass of the electrolyte solution contains 3 parts by mass of fluoroethylene carbonate. The organic solvent was prepared by mixing ethylene carbonate and propylene carbonate at a volume ratio of "ethylene carbonate to propylene carbonate=1:1". An amount of the electrolyte solution was adjusted such that a solid content ratio (ER) in the negative electrode active material slurry was 5%.

Subsequently, the negative electrode active material slurry was kneaded at a speed of 30 to 60 rpm for 20 hours using a kneader (HIVIS MIX by PRIMIX Corporation). This process is hereinafter referred to as a "predoping process". In the predoping process, lithium ions are doped into the negative electrode active material. As a result of the predoping process, lithium metal powder in the negative electrode active material slurry disappeared. After the predoping process, the negative electrode active material slurry had a potential of 0.78 V.

Subsequently, a guide of φ15 mm obtained by punching was placed on a base material formed of a nickel mesh having a mesh opening of 0.5 μm. The negative electrode active material slurry prepared as described above was poured in the guide. Then, suction filtration was performed from below the base material using a vacuum suction device, to thereby remove solvent components contained in the negative electrode active material slurry. As a result, a negative electrode cake was formed in the guide.

Subsequently, the negative electrode cake was taken out of the guide. The taken-out negative electrode cake was pressed with a hydraulic press machine to achieve an increased density. As a result, a negative electrode sample S1 was obtained. The negative electrode sample S1 had a porosity of 40%.

(ii) Formation of Positive Electrode Sample

Coated lithium cobalt aluminum composite oxide as a positive electrode active material and an electrolyte solution were mixed in a glove box having a dew point of −80° C., and stirred for 1 minute using a shaker, to thereby prepare a positive electrode active material slurry. The coated lithium cobalt aluminum composite oxide has a composition of $LiNi_{0.8}Co_{0.15}Al_{0.05}O_2$. The electrolyte solution used here is the same as the electrolyte solution used when manufacturing the negative electrode sample S1. An amount of the electrolyte solution was adjusted such that a solid content ratio (ER) in the positive electrode active material slurry was 5%.

Subsequently, a guide of φ15 mm obtained by punching was placed on a base material formed of a nickel mesh having a mesh opening of 0.5 μm. The positive electrode active material slurry prepared as described above was poured in the guide. Then, suction filtration was performed from below the base material using a vacuum suction device, to thereby remove solvent components contained in the positive electrode active material slurry. As a result, a positive electrode cake was formed in the guide. A unit weight of the positive electrode cake was adjusted such that a ratio of a negative electrode capacity A to a positive electrode capacity C (hereinafter referred to as a "capacity ratio A/C") had a value of 1.2.

Subsequently, the positive electrode cake was taken out of the guide. The taken-out positive electrode cake was pressed with a hydraulic press machine to achieve an increased density. As a result, a positive electrode sample was obtained. The positive electrode sample had a porosity of 45%.

(iii) Formation of Laminate Cell C1

The negative electrode sample S1 and the positive electrode sample formed as described above were stacked via a separator, to form a stack. The separator is a fine porous film made of polypropylene (PP) and having a thickness of 25 μm. The stack was held by a copper foil and an aluminum foil provided with leads from both sides of the stack, to thereby form a cell main body. The cell main body was soaked in 100 mL of an electrolyte solution, and was finally sealed with an aluminum laminate material under reduced pressure, to thereby form a laminate cell C1. The electrolyte solution in which the cell main body is soaked is basically the same as the electrolyte solution contained in the negative electrode active material slurry, but does not contain fluoroethylene carbonate.

(5-2) Example 2

A negative electrode sample S2 and a laminate cell C2 were formed by basically the same method as in Example 1. However, there is a difference from Example 1 in amount of the additive contained in the electrolyte solution forming the negative electrode active material slurry. In the present example, the electrolyte solution forming the negative electrode active material slurry contains 35 parts by mass of fluoroethylene carbonate relative to 100 parts by mass of the electrolyte solution.

The negative electrode active material slurry contains the same amount of lithium metal powder as in Example 1. In the present example, the negative electrode active material slurry after the predoping process had a potential of 0.83 V.

(5-3) Example 3

A negative electrode sample S3 and a laminate cell C3 were formed by basically the same method as in Example 1. However, there is a difference from Example 1 in that the electrolyte solution in which the cell main body is soaked contains fluoroethylene carbonate in the present example. The electrolyte solution in which the cell main body is soaked contains 3 parts by mass of fluoroethylene carbonate relative to 100 parts by mass of the electrolyte solution.

(5-4) Example 4

A negative electrode sample S4 and a laminate cell C4 were formed by basically the same method as in Example 1. However, there are differences from Example 1 in type and amount of the additive contained in the electrolyte solution forming the negative electrode active material slurry. In the present example, the electrolyte solution forming the negative electrode active material slurry contains 35 parts by mass of vinylene carbonate relative to 100 parts by mass of the electrolyte solution.

The negative electrode active material slurry contains the same amount of lithium metal powder as in Example 1. In the present example, the negative electrode active material slurry after the predoping process had a potential of 0.78 V.

(5-5) Example 5

A negative electrode sample S5 and a laminate cell C5 were formed by basically the same method as in Example 1. However, there is a difference from Example 1 in amount of the additive contained in the electrolyte solution forming the negative electrode active material slurry. In the present example, the electrolyte solution forming the negative electrode active material slurry contains 30 parts by mass of fluoroethylene carbonate relative to 100 parts by mass of the electrolyte solution.

The negative electrode active material slurry contains the same amount of lithium metal powder as in Example 1. In the present example, the negative electrode active material slurry after the predoping process had a potential of 0.81 V.

(5-6) Example 6

A negative electrode sample S6 and a laminate cell C6 were formed by basically the same method as in Example 1. However, there is a difference from Example 1 in amount of the additive contained in the electrolyte solution forming the negative electrode active material slurry. In the present example, the electrolyte solution forming the negative electrode active material slurry contains 0.1 parts by mass of fluoroethylene carbonate relative to 100 parts by mass of the electrolyte solution.

The negative electrode active material slurry contains the same amount of lithium metal powder as in Example 1. In the present example, the negative electrode active material slurry after the predoping process had a potential of 0.76 V.

(5-7) Example 7

A negative electrode sample S7 and a laminate cell C7 were formed by basically the same method as in Example 1. However, there is a difference from Example 1 in amount of the additive contained in the electrolyte solution forming the negative electrode active material slurry. In the present example, the electrolyte solution forming the negative electrode active material slurry contains 0.05 parts by mass of fluoroethylene carbonate relative to 100 parts by mass of the electrolyte solution.

The negative electrode active material slurry contains the same amount of lithium metal powder as in Example 1. In the present example, the negative electrode active material slurry after the predoping process had a potential of 0.75 V.

(5-8) Comparative Example 1

(i) Formation of Negative Electrode Sample

Hard carbon as a negative electrode active material and an electrolyte solution were mixed in a glove box having a dew point of −80° C., and then stirred for 1 minute with a shaker, to prepare a negative electrode active material slurry. The electrolyte solution contains an organic solvent and lithium hexafluorophosphate ($LiPF_6$). A concentration of lithium hexafluorophosphate in the electrolyte solution is 1 mol/L. Lithium fluorophosphate is dissolved in the organic solvent. The organic solvent was prepared by mixing ethylene carbonate (EC) and propylene carbonate (PC) at a volume ratio of "EC:PC=1:1". An amount of the electrolyte solution was adjusted such that a solid content ratio (ER) in the negative electrode active material slurry was 5%.

Subsequently, a guide of ϕ15 mm obtained by punching was placed on a base material formed of a nickel mesh having a mesh opening of 0.5 μm. The negative electrode active material slurry prepared as described above was poured in the guide. Then, suction filtration was performed from below the base material using a vacuum suction device, to thereby remove solvent components contained in the negative electrode active material slurry. As a result, a negative electrode cake was formed in the guide.

Subsequently, the negative electrode cake was taken out of the guide. The taken-out negative electrode cake was pressed with a hydraulic press machine to achieve an increased density. As a result, a negative electrode sample RS1 was obtained. The negative electrode sample RS1 had a porosity of 40%.

(ii) Formation of Positive Electrode Sample

Coated lithium cobalt aluminum composite oxide as a positive electrode active material and an electrolyte solution were mixed in a glove box having a dew point of −80° C., and stirred for 1 minute using a shaker, to thereby prepare a positive electrode active material slurry. The coated lithium cobalt aluminum composite oxide has a composition of $LiNi_{0.8}Co_{0.15}Al_{0.05}O_2$. The electrolyte solution used here is the same as the electrolyte solution used when forming the negative electrode sample RS1. An amount of the electrolyte solution was adjusted such that a solid content ratio (ER) in the positive electrode active material slurry was 5%.

Subsequently, a guide of ϕ15 mm obtained by punching was placed on a base material formed of a nickel mesh having a mesh opening of 0.5 μm. The positive electrode active material slurry prepared as described above was poured in the guide. Then, suction filtration was performed from below the base material using a vacuum suction device, to thereby remove solvent components contained in the positive electrode active material slurry. As a result, a positive electrode cake was formed in the guide. A unit weight of the positive electrode cake was adjusted such that the capacity ratio A/C had a value of 1.2.

Subsequently, the positive electrode cake was taken out of the guide. The taken-out positive electrode cake was pressed with a hydraulic press machine to achieve an increased density. As a result, a positive electrode sample was obtained. The positive electrode sample had a porosity of 45%.

(iii) Formation of Laminate Cell RC1

The negative electrode sample RS1 and the positive electrode sample formed as described above were stacked via a separator, to form a stack. The separator is a fine porous film made of polypropylene (PP) and having a thickness of 25 μm. The stack was held by a copper foil and an aluminum foil provided with leads from both sides of the stack, to thereby form a cell main body. The cell main body was soaked in 100 mL of an electrolyte solution, and was finally sealed with an aluminum laminate material under reduced pressure, to thereby form a laminate cell RC1. The electrolyte solution in which the cell main body is soaked is basically the same as the electrolyte solution contained in the negative electrode active material slurry.

(5-9) Comparative Example 2

A negative electrode sample RS2 and a laminate cell RC2 were formed by basically the same method as in Comparative Example 1. However, there is a difference from Comparative Example 1 in that the electrolyte solution in which the cell main body is soaked contains an additive. In the present comparative example, the electrolyte solution in which the cell main body is soaked contains 3 parts by mass of fluoroethylene carbonate relative to 100 parts by mass of the electrolyte solution.

(5-10) Comparative Example 3

A negative electrode sample RS3 and a laminate cell RC3 were formed by basically the same method as in Example 1. However, there is a difference from Example 1 in that the electrolyte solution forming the negative electrode active material slurry does not contain an additive.

(5-11) Comparative Example 4

A negative electrode sample RS4 and a laminate cell RC4 were formed by basically the same method as in Example 1. However, there is a difference from Example 1 in that the electrolyte solution forming the negative electrode active material slurry does not contain an additive. There is also a difference from Example 1 in that the electrolyte solution in which the cell main body is soaked contains an additive. In the present comparative example, the electrolyte solution in which the cell main body is soaked contains 3 parts by mass of fluoroethylene carbonate relative to 100 parts by mass of the electrolyte solution.

Table 1 shows manufacturing conditions for the laminate cells in Examples 1 to 7 and Comparative Examples 1 to 4.

TABLE 1

| | Predoping Yes/No | Additive 1 | Additive 2 | Presence/ Absence of Residual Additive in Electrolyte Solution | Charge- Discharge Efficiency [%] | Gas Generation Amount after Initial Charge and Discharge | Gas Generation Amount after Durability Test | Capacity Retention Rate [%] |
|---|---|---|---|---|---|---|---|---|
| Example 1 | Yes | FEC: 3% | None | Absent | 90 | A | A | 95 |
| Example 2 | Yes | FEC: 35% | None | Present | 86 | B | B | 92 |
| Example 3 | Yes | FEC: 3% | FEC: 3% | Absent | 87 | B | B | 92 |
| Example 4 | Yes | VC: 3% | None | Absent | 90 | A | A | 95 |
| Example 5 | Yes | FEC: 30% | None | Absent | 88 | A | A | 93 |
| Example 6 | Yes | FEC: 0.1% | None | Absent | 90 | A | A | 91 |
| Example 7 | Yes | FEC: 0.05% | None | Absent | 90 | B | B | 90 |
| Comparative Example 1 | No | — | None | Absent | 75 | D | D | 79 |
| Comparative Example 2 | No | — | FEC: 3% | Present | 73 | D | D | 75 |
| Comparative Example 3 | Yes | None | None | Absent | 89 | C | C | 85 |
| Comparative Example 4 | Yes | None | FEC: 3% | Present | 87 | B | C | 82 |

In Table 1, a column of Additive 1 indicates a type and a concentration of each additive contained in the electrolyte solution forming the negative electrode active material slurry. A column of Additive 2 indicates a type and a concentration of each additive contained in the electrolyte solution in which the cell main body is soaked.

(5-12) Evaluations of Laminate Cells

Evaluations were performed on the laminate cells formed in Examples 1 to 7, and Comparative Examples 1 to 4.

(i) Preparation for Evaluations

Each laminate cell was placed in a thermostatic chamber, and temperature control was performed. A set temperature in the thermostatic chamber was 25° C. In that state, one cycle of charge and discharge of the laminate cell was performed using a charge and discharge system (produced by HOKUTO DENKO CORPORATION). During this charge and discharge, charge was performed with a charge current of 0.05 C by CCCV charging up to a termination voltage of 4.2 V, and then discharge was performed with a discharge current of 0.05 C down to a termination voltage of 2.5 V. Thereafter, evaluations of (ii) to (vi) were conducted.

(ii) Measurement of Charge-Discharge Efficiency

In the process of charge and discharge in (i) above, a battery capacity after charge and a battery capacity after discharge were measured. Then, a ratio (hereinafter referred to as a "charge-discharge efficiency") of the battery capacity after discharge to the battery capacity after charge was calculated. A unit of the charge-discharge efficiency is percent. The charge-discharge efficiency is also referred to as "coulombic efficiency".

The charge-discharge efficiency (%) is represented by following Formula (1):

$$Y = (Z_1/Z_2) \times 100 \quad \text{Formula (1)}$$

In Formula (1), Y is the charge-discharge efficiency (%). $Z_1$ is the battery capacity (mAh/g) after discharge. $Z_2$ is the battery capacity (mAh/g) after charge.

Measurement results are shown in Table 1 above. As the charge-discharge efficiency is greater, charged energy can be used more efficiently for discharge, which is preferable. The laminate cell of each of Examples had an equal or greater charge-discharge efficiency than the charge-discharge efficiency of the laminate cell of each of Comparative Examples.

(iii) Measurement of Presence/Absence of Residual Additive in Electrolyte Solution After one hour of storage, the laminate cell was disassembled. Subsequently, NMR measurement was conducted on the electrolyte solution in which the cell main body was soaked, to thereby confirm presence/absence of residual additive in the electrolyte solution. The results are shown in Table 1 above.

(iv) Evaluation of Gas Generation Amount after Initial Charge and Discharge

A volume $V_0$ of each laminate cell immediately after formation was measured. Subsequently, an initial charge and discharge of the laminate cell was performed, and then a volume $V_1$ of the laminate cell was measured. A gas generation amount after the initial charge and discharge was evaluated based on the following criteria:

A: $(V_1-V_0)/V_0$ has a value less than 0.05%.
B: $(V_1-V_0)/V_0$ has a value of 0.05% or more and less than 0.1%.
C: $(V_1-V_0)/V_0$ has a value of 0.1% or more and less than 0.3%.
D: $(V_1-V_0)/V_0$ has a value of 0.3% or more.

The evaluation results are shown in Table 1 above. The laminate cell of each of Examples had an equal or smaller gas generation amount than the gas generation amount of the laminate cell of each of Comparative Examples.

(v) Evaluation of Gas Generation Amount after Durability Test

A volume $V_0$ of each laminate cell immediately after formation was measured. Subsequently, charge and discharge of the laminate cell was repeated by 100 cycles, and then a volume $V_{100}$ of the laminate cell was measured. A gas generation amount after such durability test was evaluated based on the following criteria:

A: $(V_{100}-V_0)/V_0$ has a value less than 0.05%.
B: $(V_{100}-V_0)/V_0$ has a value of 0.05% or more and less than 0.1%.
C: $(V_{100}-V_0)/V_0$ has a value of 0.1% or more and less than 0.3%.
D: $(V_{100}-V_0)/V_0$ has a value of 0.3% or more.

The evaluation results are shown in Table 1 above. The laminate cell of each of Examples had a gas generation amount less than the gas generation amount of the laminate cell of each of Comparative Examples.

(vi) Evaluation of Cycle Durability

Charge and discharge of each laminate cell was repeated by 100 cycles. During the charge and discharge of the first cycle, charge was performed with a charge current of 0.05 C by CCCV charging up to a termination voltage of 4.2 V, and then discharge was performed with a discharge current of 0.05 C down to a termination voltage of 2.5 V. During the charge and discharge from the second to ninety-ninth cycles, charge was performed with a charge current of 0.3 C by CCCV charging up to a termination voltage of 4.2 V, and then discharge was performed with a discharge current of 0.3 C down to a termination voltage of 2.5 V. During charge and discharge of the 100th cycle, charge and discharge was performed in the same manner as in the first cycle.

A rate of the capacity in the 100th cycle relative to the initial capacity (hereinafter referred to as a "capacity retention rate") was calculated. Calculation results of the capacity retention rate are shown in Table 1 above. The capacity retention rate of the laminate cell of each of Examples was higher than the capacity retention rate of the laminate cell of each of Comparative Examples.

6. Other Embodiments

Although embodiments of the present disclosure have been described above, the present disclosure is not limited to the above-described embodiments, but may be implemented in various modified forms.

(1) A function served by a single element in the embodiments above may be served by a plurality of elements, or a function served by a plurality of elements may be served by a single element. Also, a part of a configuration in any of the embodiments above may be omitted. Further, at least a part of a configuration in any of the embodiments above may be added to, or replace, a configuration in another embodiment. It is to be noted that any form within the technical scope defined by the language of the appended claims may be an embodiment of the present disclosure.

(2) In addition to the predoping method for a negative electrode active material, the manufacturing method for a negative electrode, and the manufacturing method for a power storage device as described above, the present disclosure may also be achieved in various forms, including a manufacturing method for a negative electrode active material, a negative electrode active material, a negative electrode, a power storage device, and so on.

The invention claimed is:

1. A method of predoping a negative electrode active material with lithium ions, the method comprising:
   mixing an electrolyte solution and the negative electrode active material and adding lithium metal, to thereby prepare a slurry comprising the electrolyte solution in which the negative electrode active material and the lithium metal are dispersed; and
   doping the negative electrode active material with lithium ions by kneading the slurry,
   wherein the electrolyte solution comprises:
   a solvent;
   lithium ions; and
   an additive having a reduction potential higher than a reduction potential of the solvent, and
   wherein the electrolyte solution comprises 3 parts by mass or more and 50 parts by mass or less of the additive relative to 100 parts by mass of the electrolyte solution.

2. The method of claim 1,
   wherein the additive is one or more selected from the group consisting of vinylene carbonate, ethylene sulfite, and fluoroethylene carbonate.

3. A method of manufacturing a negative electrode, the method comprising:
   obtaining a negative electrode active material doped with lithium ions by the method according to claim 1; and
   applying to a negative electrode current collector the negative electrode active material doped with lithium ions, to thereby obtain the negative electrode.

4. A method of manufacturing a power storage device, the method comprising:
   stacking a positive electrode, an electrolyte layer, and the negative electrode, which is manufactured by the method according to claim 3, in this order; and
   encapsulating said stacked positive electrode, electrolyte layer, negative electrode inside an exterior material, to thereby obtain the power storage device.

5. The method of claim 4,
   wherein the power storage device is a lithium-ion rechargeable battery or a lithium ion capacitor.

* * * * *